US006488762B1

(12) United States Patent
Shi

(10) Patent No.: US 6,488,762 B1
(45) Date of Patent: Dec. 3, 2002

(54) COMPOSITION OF MATERIALS FOR USE IN CELLULAR LIGHTWEIGHT CONCRETE AND METHODS THEREOF

(75) Inventor: Caijun Shi, Burlington (CA)

(73) Assignee: Advanced Materials Technologies, LLC, Hamburg, NY (US)

( * ) Notice: Subject to any disclaimer, the term of this patent is extended or adjusted under 35 U.S.C. 154(b) by 0 days.

(21) Appl. No.: 09/699,941

(22) Filed: Oct. 30, 2000

(51) Int. Cl.[7] .......................... C04B 18/04; C04B 18/30
(52) U.S. Cl. ....................... 106/676; 106/677; 106/678; 106/679; 106/697
(58) Field of Search ............... 106/676, 677, 106/678, 679, 697

(56) References Cited

U.S. PATENT DOCUMENTS

| | | |
|---|---|---|
| 112,929 A | 3/1871 | Kreischer |
| 1,751,430 A | 3/1930 | Thomson .................... 106/680 |
| 1,932,971 A | 10/1933 | Huttemann et al. ......... 106/700 |
| 2,053,842 A | 9/1936 | Rice .......................... 106/646 |
| 2,364,344 A | 12/1944 | Connell et al. ............. 106/664 |
| 2,432,971 A | 12/1947 | Ruthman et al. ........... 106/674 |
| 2,598,981 A | 6/1952 | Denning ..................... 106/675 |
| 2,864,714 A | 12/1958 | Dixon et al. ................ 106/667 |
| 3,041,190 A | 6/1962 | Griffith et al. .............. 106/672 |
| 3,062,669 A | 11/1962 | Dilnot ........................ 106/674 |
| 3,192,060 A | 6/1965 | Tilsen ......................... 106/709 |
| 3,563,930 A | 2/1971 | Stram et al. ................... 524/5 |
| 3,573,941 A | 4/1971 | Edwards et al. ............ 106/677 |
| 3,615,784 A | 10/1971 | Cattanach .................. 106/646 |
| 3,625,723 A | 12/1971 | Sicka ......................... 106/679 |
| 3,663,287 A | 5/1972 | Mizunuma et al. ......... 106/820 |
| 3,669,701 A | 6/1972 | Biederman, Jr. ............ 106/706 |
| 3,814,614 A * | 6/1974 | Kraemer et al. ............ 106/605 |
| 3,852,084 A | 12/1974 | Webster et al. ............. 106/710 |
| 3,867,159 A | 2/1975 | Ergene ....................... 106/646 |
| 3,963,507 A | 6/1976 | Kuramoto et al. .......... 106/674 |
| 3,989,534 A | 11/1976 | Plunguian et al. .......... 106/646 |
| 4,084,980 A | 4/1978 | Motoki ....................... 106/601 |
| 4,097,422 A | 6/1978 | Markusch ................... 521/154 |
| 4,111,913 A | 9/1978 | Schuhmacker et al. ..... 528/273 |
| 4,116,703 A | 9/1978 | Stempin et al. ............. 106/601 |
| 4,142,910 A | 3/1979 | Kraemer et al. ............ 106/672 |
| 4,268,316 A | 5/1981 | Wills, Jr. .................... 106/707 |
| 4,341,876 A | 7/1982 | Kreuer et al. ............... 106/122 |
| 4,351,670 A | 9/1982 | Grice ......................... 106/672 |
| 4,568,390 A | 2/1986 | Gelbman .................... 106/718 |
| 4,673,437 A | 6/1987 | Gelbman .................... 106/718 |
| 4,683,019 A | 7/1987 | Motoki ....................... 106/718 |
| 4,900,359 A | 2/1990 | Gelbman .................... 106/681 |

FOREIGN PATENT DOCUMENTS

| | | |
|---|---|---|
| AU | 144247 | 1/1951 |
| GB | 593309 | 10/1947 |

* cited by examiner

*Primary Examiner*—Elizabeth D. Wood
(74) *Attorney, Agent, or Firm*—Hodgson Russ LLP

(57) ABSTRACT

A more economical and light-color cellular concrete is provided by the replacement of Portland cement with ground glass powder in a cellular lightweight concrete mixture and the resulting method to make cellular concrete products. The use of ground glass also increases the stability of the cellular lightweight concrete mixture during the foaming or aeration process. The products are suitable for use in structural applications, insulation, and as a lightweight aggregate.

19 Claims, No Drawings

COMPOSITION OF MATERIALS FOR USE IN CELLULAR LIGHTWEIGHT CONCRETE AND METHODS THEREOF

FIELD OF THE INVENTION

This invention relates to compositions and a method of use of such compositions to produce cellular lightweight concrete suitable for structural applications, insulation, and as a lightweight aggregate.

BACKGROUND OF THE INVENTION

In general, there are two ways to achieve a low density concrete. Firstly, using a low density aggregate such as pumice or other lightweight rock. However, the use of lightweight aggregate material is not always feasible, since it is generally unavailable in many locations. The second way is to introduce gas or foam to the concrete mix to produce cellular lightweight concrete. According to ASTM specification, a cellular concrete is a lightweight product consisting of Portland cement, cement-silica, cement-pozzolan, lime-pozzolan, lime-silica pastes or pastes containing blends of these gradients and having homogeneous void or cell structure, attained with gas-forming chemicals of foaming agents. In cellular lightweight concrete, the density can be controlled by the introduction of gas or foam. The use of cellular concrete overcomes the supply problem associated with the use of lightweight aggregates, and further allows an increased degree of control of the density of the finished product. Thus, cellular concrete can be useful in floor fill and roof deck applications, providing insulation and a high degree of fire protection. It is generally unsuitable as a structural material because of shrinkage and cracking.

Cellular lightweight concrete has existed since the 1930's and is produced throughout the world. It is known for its properties including thermal and sound insulation, as well as being lightweight. Traditionally, cellular lightweight concrete is made with calcium containing materials and siliceous materials. Calcium containing materials may include Portland cement, granulated blast furnace slag, and lime; siliceous materials include fly ash and ground silica.

U.S. Pat. No. 5,002,620, discloses a method for a composite product which is formed from the casting of the lighter fraction over the heavier fraction to form a single sheet, with the lighter fractions of separate sheets being planed and bonded together with a vapor barrier therebetween to form blocks, wall panels, beams, and the like. The patent mentions that the concrete may be comprised of materials selected from the group including: Portland cement, suitable aggregates, fibrous reinforcing materials, ash from refuse-derived fuel, expanded silicate, water, sand, a preferred foaming agent and a source of compressed gas used in part to induce bubbles into the mix, and, a suitable vapor barrier/resin for use in bonding and moisture resistance. However, no details about those materials and proportions for each material were disclosed.

U.S. Pat. No. 5,183,505 discloses a cellular concrete mix with the addition of cementitious or non-cementitious fines. Cementitious fines consist of fly ash (Type F and C), slag cement and kiln dust. Non-cementitious fines selected from the group consisting of limestone, silica and granitic fines, and the amount by weight of said non-cementitious fines does not exceed about 50% of the combined weight of the cement and non-cementitious fines. The preferred ratio of cement to fines is 7:3, and the minimum amount of fines, either cementitious or non-cementitious, should not be below about 10% of the total weight of cement and fines.

U.S. Pat. No. 5,782,970 discloses a lightweight insulating concrete produced from a cement mix containing sawdust, diatomite, bentonite, and lime. The addition of rock salt and the entrainment of air bubbles result in a concrete with a high compressive strength, high thermal resistance (R) values (up to 30 to 40 times that of standard concrete), and excellent acoustical properties. The resulting insulating concrete is one-third the weight of standard concrete.

The use of recycled glass in glass manufacturing reduces energy consumption, raw materials use, and tear on machinery. However, not all used glass can be recycled into new product because of impurity, cost, or mixed colors. It is reported that the quantity of mixed waste glass has outstripped the quantity of color sorted glass. There is a need to develop applications for mixed waste glass. Use of recycled materials in construction applications is one of the most attractive options because of the large quantity, low quality requirements, and widespread sites of construction. The primary applications include a partial replacement for aggregate in asphalt concrete, as fine aggregate in unbonded base course, pipe bedding, landfill gas venting systems, and gravel backfill for distribution and sewer pipes. Ground glass possess pozzolanic reactivity, but cannot be used as a cement replacement in conventional concrete because of potential alkali-aggregate reaction. However, it can be used in the production of cellular lightweight concrete since alkali-aggregate reaction is not a concern.

SUMMARY AND OBJECT OF THE INVENTION

We have discovered that an economical and stable cellular concrete can be produced by the substitution of ground mixed waste glass for a portion of the cement in a cellular concrete mixture. The cellular concrete mixture containing ground glass are significantly more stable during foaming or aeration expansion process. It can be cured at either room or high temperatures to form hardened lightweight concrete products, which have a light-grey color and are more attractive than those containing coal fly ash.

More particularly, it is a purpose of this invention to provide a method of manufacturing cellular lightweight concrete using ground glass as a partial replacement for Portland cement in the mixtures.

A further objective of this invention is to be able to produce very stable cellular lightweight concrete mixtures during the foaming or aeration process.

A further objective of this invention is to be able to produce light color cellular lightweight concrete mixtures that can be easily tinted by adding proper pigments.

Yet another objective of this invention is to be able to provide applications which can use inexpensive recycled materials.

The aforementioned objectives are achieved by cellular lightweight concrete mixtures according to the present invention.

Briefly, therefore, the invention is directed to cellular lightweight concrete mixtures containing ground recycled waste glass that can be cured in steam at varying temperatures, and are characterized by excellent mechanical properties. The mixtures according to the present invention are composed of 3 to 70% cement, 3 to 70% ground glass, 0 to 60% cement substitute, 0 to 15% lime, up to 5% by weight fiber, 30 to 80% water, and up to 2% gas-forming or foaming agent. These materials are mixed to form a slurry, and poured into molds. The resulting products can either be cured at room or elevated temperatures.

With the forgoing and other objects, features and advantages of the invention that will become hereinafter apparent, the nature of the invention may be more clearly understood by reference to the following detailed description of presently preferred mechanical embodiments of the invention and the appended claims given for the purpose of disclosure.

DESCRIPTION OF THE PREFERRED EMBODIMENTS

The invention includes a mixture for producing cellular lightweight concrete. The mixture comprises cement, ground glass, cement substitute, lime, fiber, foaming agent and water. The invention also incorporates a method of making cellular lightweight concrete including mixing these materials in a mixer to form a thick, viscous slurry which will be foamed and cured at room or elevated temperatures.

The mixture may comprise approximately 3 to 70% by weight cement, 3 to 70% by weight ground glass, 3 to 60% by weight cement substitute, 0 to 15% by weight lime, 0 to 5% by weight fiber, 30 to 80% by weight water, and up to 2% by weight gas-forming or foaming agent. The mixing process can vary when gas-forming agents or foaming agents are used. When gas-forming agents such as aluminum, zinc, or magnesium are used, dry materials are uniformly blended and then mixed with water in a bowl mixer. It takes two to three minutes to yield a mixture with proper consistency. After mixing, the mixture is poured into a mold, filling one-half to three-quarters of its volume, depending on the proportions of the mixture for various finished products. The mixture will expand to the full volume of the mold within 15 to 45 minutes. After a period of 2 to 6 hours after pouring, the molded mixtures can be cured in a moist environment at room or elevated temperatures.

If a foaming agent is selected from alkaline salts of natural woods' resins, or alkaline salts of fatty acids, or alkaline salts of sulfonated organic compounds, the agent should be first mixed with water first, then mixed with the blended dry materials. The mixing time necessary to yield a mixture with the proper consistency and bubble structure can vary depending upon the percentage of each constituent added to the mixture. After the proper mixing, the mixture is added to fill the molds. In 2 to 6 hours after molding, the mixtures in the molds can be cured in a moist environment at room or elevated temperatures.

Based on ASTM Standards, Portland cement can be classified into Type I, Type II, Type III, Type IV and Type V. The cement portion of the mixture may comprise any type of Portland cement. The amount of cement should be between 3 to 70% by weight of the total mixture.

Th ground glass may include ground mixed waste glass, flat glass, window glass and mixtures thereof. The color of the glass is not of concern, since the amount of colored glass is usually much less than that of clear glass. The use of colored glass does not have a significant effect on properties and color of the cellular lightweight concrete mixtures. However, impurities in mixed waste glass, such as metals, plastics, paper, and wood should be separated. Waste glass should be ground to a particle size passing through a number 30 sieve. The amount of ground glass should be between 3 to 70% by weight of the total mixture.

Lime may include hydrated lime, quicklime or lime kiln dust. The lime kiln dust should contain free CaO not less than 50%. The lime concentration in the form of CaO should be up to 15% by weight of the mixture.

Cement substitutes can be divided into two categories: reactive and non-reactive. Reactive materials have cementitious or pozzolanic properties and can also be supplementary cementing materials including ground blast furnace slag, coal fly ash, natural pozzolans, ground steel slag and silica fume. Non-reactive materials do not have any cementitious or pozzolanic properties and usually act as inert fillers in hardened cement pastes or concrete. Typical examples include: silica flour, crushed stone dust, saw dust and/or pulverized ceramics.

The other important component in a cellular concrete mixture is the gas-forming agent or foaming agent (air-bubble foam-making agent). The stable air bubble can be generated through chemical reaction between a gas-forming agent, such as aluminum, zinc or magnesium, and an alkaline solution; or, through mechanical agitation of an aqueous solution of foaming agent which comprises one of the alkaline salts of natural woods' resins, alkaline salts of fatty acids, or alkaline salts of sulfonated organic compounds.

EXAMPLE 1

Two batches of cellular lightweight concrete mixture were prepared with different amount of cement, glass and aluminum powder. The proportions of materials for the two batches are listed in Table 1. The dry materials were first blended uniformly, then mixed with water. The mixtures were poured into one 6.5"×13"×18" stainless mold and ten (10) 2"×2"×2" plastic cubes filled to about 60% of their volume. The mixture expanded to completely fill these plastic molds within 45 minutes. After setting for an additional two hours in a sample preparation room, the large sample and 6 cube samples with molds were cured in a steam chamber for 15 hours at 85° C.; the remaining 4 cubes were cured in a moist temperature chamber at 23° C.

After curing, these samples were cooled to room temperature and demolded. Three cubes from each curing chamber were tested for moisture content, dry bulk density and dry compressive strength. The large sample was kept for visual observation.

The results in Table 1 indicate that the density of cellular lightweight concrete from the first batch (Mix I) is only about 30% of conventional concrete. It shows excellent strength after steam curing at 85° C. The compressive strength after 7 days curing at room temperature is very close to that of curing at 85° C. The product has a very light grey color and can be easily tinted.

The second batch (Mix II) contained less cement and more glass than the first batch (Mix I). The two batches have very similar oven-dry density, but the second batch showed lower strength than the first batch. However, the second batch has sufficient structural value for insulation purpose.

TABLE 1

Density and Strength of Cellular Lightweight Concrete Containing Ground Glass

|  | Mix I | Mix II |
|---|---|---|
| COMPOSITION (PERCENTAGE BY WEIGHT) | | |
| Portland cement | 29.7 | 5.3 |
| Ground recycled glass | 33.0 | 59.5 |
| Hydrated lime | 3.3 | 1.3 |
| Polypropylene fiber | 0.7 | 0.7 |

TABLE 1-continued

Density and Strength of Cellular Lightweight Concrete Containing Ground Glass

|  | Mix I | Mix II |
|---|---|---|
| Aluminum powder | 0.2 | 0.13 |
| Water | 33.0 | 33.1 |
| DRY BULK DENSITY (Kg/m$^3$) | 708 | 743 |
| DRY COMPRESSIVE STRENGTH (MPa) |  |  |
| After 15 hours of steam curing at 85° C. | 4.9 | 1.9 |
| After 3 days of moist curing at 23° C. | 2.7 |  |
| After 7 days of moist curing at 23° C. | 4.1 |  |

EXAMPLE 2

The sample preparation and curing of sample were very similar to those described by example 1. However, ground steel slag replaced some of the Portland cement and ground glass. The introduction of steel slag slightly increased density and strength of the concrete. The cellular lightweight concrete containing steel slag has a darker color than the mixture without steel slag.

TABLE 2

Density and Strength of Cellular Lightweight Concrete Containing Ground Glass and Steel Slag

| Composition (PERCENTAGE BY WEIGHT) |  |
|---|---|
| Portland cement | 29.7 |
| Ground steel slag | 11.0 |
| Ground recycled glass | 22.0 |
| Hydrated lime | 3.3 |
| Polypropylene fiber | 0.7 |
| Foaming agent (Aluminum powder) | 0.2 |
| Water | 33.0 |
| Dry Bulk Density (kg/m$^3$) | 708 |
| Dry Compressive Strength (MPa) |  |
| After 15 hours of steam curing at 85° C. | 4.9 |
| After 1 day of moist curing at 23° C. | 2.7 |
| After 7 days of moist curing at 23° C. | 4.1 |

EXAMPLE 3

The sample preparation and curing of sample were very similar to those described by example 1. However, coal fly ash replaced some of the Portland cement and ground glass. The mixing proportions and some test results are summarized in Table 3. In the first batch, although a high content of cement was used, the concrete still showed a high density of 911 kg/m$^3$ because of lack of lime. A high cement content and a high density result a high strength of 9.1 MPa after 15 hours of steam curing at 85° C. In the other batch (Mix II), a high content of fly ash was used. The density of resultant concrete is less than one third of that of regular concrete. The strength of concrete is 3.3 MPa after 15 hours of steam curing at 85° C., which is strong enough for non load-bearing walls.

TABLE 3

Density and Strength of Cellular Lightweight Concrete Containing Ground Glass and Coal Fly Ash

|  | Mix I | Mix II |
|---|---|---|
| COMPOSITION (PERCENTAGE BY WEIGHT) |  |  |
| Portland cement | 52.9 | 6.6 |
| Ground recycled glass | 6.5 | 3.3 |
| Hydrated lime | 0 | 6.6 |
| Coal Fly Ash | 6.5 | 49.6 |
| Polypropylene fiber | 0.7 | 0.7 |
| Aluminum powder | 0.13 | 0.13 |
| Water | 33.1 | 33.1 |
| DRY BULK DENSITY (Kg/m$^3$) | 911 | 744 |
| DRY COMPRESSIVE STRENGTH (MPa) |  |  |
| After 15 hours of steam curing at 85° C. | 8.4 | 3.3 |

EXAMPLE 4

In this example, two batches with low cement content but with high blast furnace slag or glass content were investigated. The mixing proportions and some test results are summarized in Table 4. Both batches showed a very similar density. In the first batch, although a low content of cement was used, a high content of blast furnace slag resulted in high strength of 3.0 MPa after 15 hours of steam curing at 85° C., which is strong enough for non load-bearing walls. In the second batch (Mix II), a high content of glass was used. The batch showed a strength of 2 MPa after 15 hours of steam curing at 85° C., which is strong enough for non load-bearing walls.

TABLE 4

Density and Strength of Cellular Lightweight Concrete Containing Ground Glass and Ground Blast Furnace Slag

|  | Mix I | Mix II |
|---|---|---|
| COMPOSITION (PERCENTAGE BY WEIGHT) |  |  |
| Portland cement | 3.3 | 3.3 |
| Ground recycled glass | 3.3 | 52.9 |
| Hydrated lime | 3.3 | 3.3 |
| Ground Blast Furnace Slag | 56.2 | 6.6 |
| Polypropylene fiber | 0.7 | 0.7 |
| Aluminum powder | 0.13 | 0.13 |
| Water | 33.1 | 33.1 |
| DRY BULK DENSITY (Kg/m$^3$) | 779 | 732 |
| DRY COMPRESSIVE STRENGTH (MPa) |  |  |
| After 15 hours of steam curing at 85° C. | 3.0 | 2.0 |

The forgoing has described the invention and certain embodiments thereof. It is to be understood that the invention is not necessarily limited to the precise embodiments described therein but variously practiced with the scope of the following claims.

I claim:

1. A cellular concrete mixture comprising, by weight percent:
   (a) about 3% to 70% cement;
   (b) about 3% to 70% ground glass as a first cement substitute, wherein the ground glass is selected from the group consisting of mixed waste glass, flat glass, window glass, and mixtures thereof;

(c) 0 to 60% of a second cement substitute;

(d) a lime-containing material;

(e) a gas-forming agent or foaming agent; and (f) at least 20% water.

2. The cellular concrete mixture of claim 1 wherein the cement includes any type of Portland cement.

3. The cellular concrete mixture of claim 1 wherein the second cement substitute is selected from the group consisting of coal fly ash, natural pozzolan, ground blast furnace slag, ground steel slag, silica fume, and mixtures thereof.

4. The cellular concrete mixture of claim 1 including a material selected from the group consisting of fine sand, crushed stone dust, saw dust, pulverized ceramics, and mixtures thereof.

5. The cellular concrete mixture of claim 1 wherein the lime-containing material is selected from the group consisting of quick lime, hydrated lime, any material containing at least 40% free CaO, and mixtures thereof.

6. The cellular concrete mixture of claim 1 wherein the gas-forming agent is selected from the group consisting of aluminum, zinc, aluminum sulfate, magnesium powders, and mixtures thereof.

7. The cellular concrete mixture of claim 1 wherein the foaming agent is an alkaline salt selected from the group consisting of natural wood resins, fatty acids, sulfonated organic compounds, and mixtures thereof.

8. The cellular concrete mixture of claim 1 containing fibers selected from the group consisting of organic, ceramic, carbon, steel, cellulose fibers, and mixtures thereof.

9. A method for making a cellular concrete product, comprising the steps of:

(a) providing a mixture of, by weight percent, about 3% to 70% cement, about 3% to 70% ground glass as a first cement substitute, 0 to 60% of a second cement substitute, a lime-containing material, a gas-forming agent or foaming agent, and at least 20% water, wherein the ground glass is selected from the group consisting of mixed waste glass, flat glass, window glass, and mixtures thereof;

(b) pouring the mixture into a form or mold of the intended concrete product;

(c) curing the poured mixture;

(d) demolding the concrete product; and (e) utilizing the concrete product.

10. The method of claim 9 including providing any type of Portland cement in the concrete mixture.

11. The method of claim 9 including selecting the second cement substitute from the group consisting of coal fly ash, natural pozzolan, ground blast furnace slag, ground steel slag, silica fume, and mixtures thereof.

12. The method of claim 9 including providing the mixture with a material selected from the group consisting of fine sand, crushed stone dust, saw dust, pulverized ceramics, and mixtures thereof.

13. The method of claim 9 including selecting the lime-containing material from the group consisting of quick lime, hydrated lime, any material containing at least 40% free CaO, and mixtures thereof.

14. The method of claim 9 including selecting the gas-forming agent from the group consisting of aluminum, magnesium powders, aluminum sulfate, and mixtures thereof.

15. The method of claim 9 including selecting the foaming agent from the group consisting of natural wood resins, fatty acids, sulfonated organic compounds, and mixtures thereof.

16. The method of claim 9 including selecting the fibers from the group consisting of organic, ceramic, carbon, steel, cellulose fibers, and mixtures thereof.

17. The cellular concrete mixture of claim 1 wherein the ground waste glass is sized to pass through a number 30 sieve.

18. The method of claim 9 including passing the ground waste glass through a number 30 sieve before introducing it into the mixture.

19. A cellular concrete mixture comprising, by weight percent:

(a) about 3% to,70% cement;

(b) about 3% to 70% ground glass powder capable of passing trough a number 30 sieve, wherein the ground glass as a first cement substitute is selected from the group consisting of mixed waste glass, flat glass, window glass, and mixtures thereof;

(c) 0 to 60% of a second cement substitute;

(d) a lime-containing material;

(e) a gas-forming agent or foaming agent; and (f) at least 20% water.

* * * * *